April 1, 1924.                                                1,488,740
T. C. DOBBINS
RESILIENT UNIVERSAL JOINT FOR POWER TRANSMISSION
Filed Dec. 23, 1922                    2 Sheets-Sheet 1
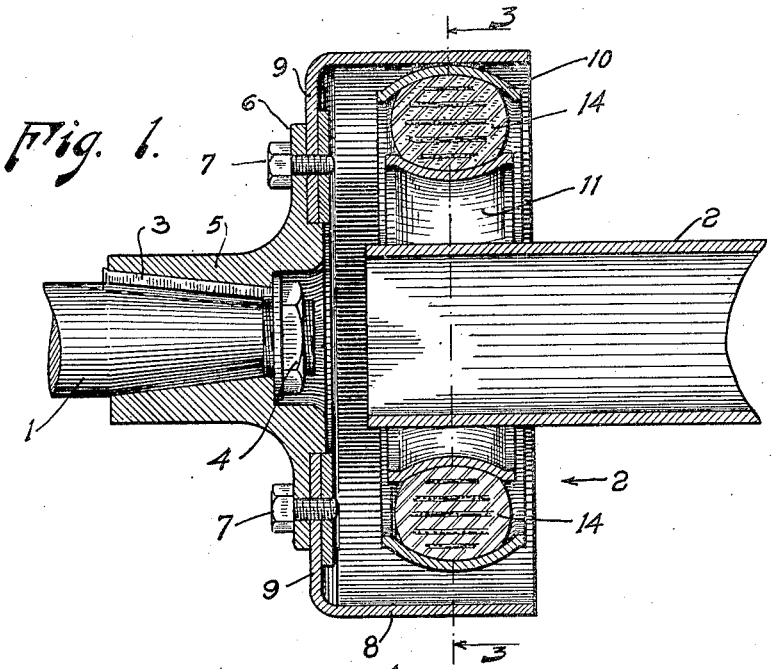
Fig. 1.
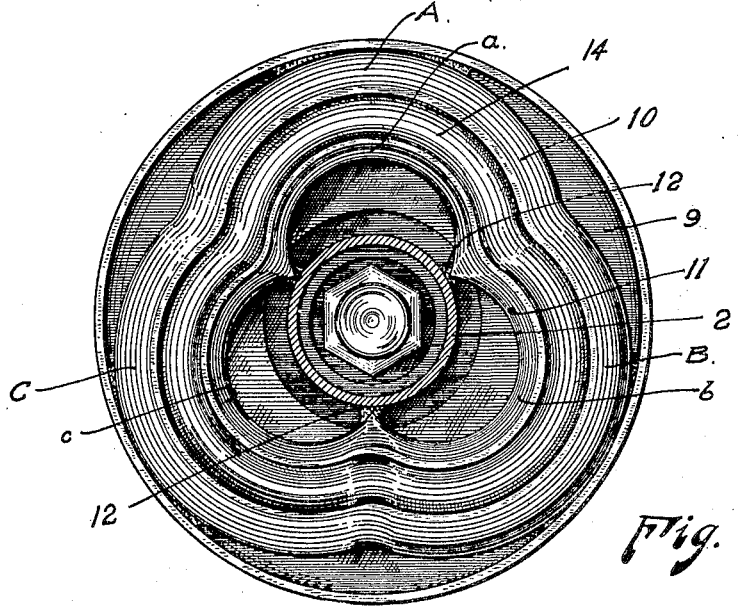
Fig. 2.
Inventor
Timothy C. Dobbins.
Attorney April 1, 1924.  
T. C. DOBBINS  
1,488,740  
RESILIENT UNIVERSAL JOINT FOR POWER TRANSMISSION  
Filed Dec. 23, 1922   2 Sheets-Sheet 2

Inventor  
Timothy C. Dobbins.  
By A. J. O'Brien  
Attorney

Patented Apr. 1, 1924.

1,488,740

UNITED STATES PATENT OFFICE.

TIMOTHY C. DOBBINS, OF DENVER, COLORADO.

RESILIENT UNIVERSAL JOINT FOR POWER TRANSMISSION.

Application filed December 23, 1922. Serial No. 608,603.

*To all whom it may concern:*

Be it known that I, TIMOTHY C. DOBBINS, a citizen of the United States, residing at Denver, in the city and county of Denver and State of Colorado, have invented certain new and useful Improvements in Resilient Universal Joints for Power Transmission; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in resilient universal joints for power transmission.

It is well known that it is necessary at times to be able to transmit power through a shaft composed of two or more sections rotating about axes which make various angles with each other. As an example of a machine requiring such power transmission, attention is called to the automobile where the power is transmitted from the engine to the rear axle differential through a shaft that is connected to the engine by what is known as a universal coupling which permits the torque shaft to rotate freely, even though its axis of rotation is at a considerable angle to that of the engine shaft. As the rear axle moves with respect to the engine, it is also necessary to provide means which permit a slight elongation to take place.

It is the object of this invention to produce an improved resilient universal joint that shall enable power to be positively transmitted by means which will yield slightly so as to prevent excessive strains due to sudden shocks from being transmitted to the gears of the differential, which frequently become injured through this cause, and which smoothens out the pulsations of the engine.

It is a further object of this invention to produce a universal joint that shall be noiseless in its operation and which can be freely exposed to dust without danger of the latter interfering with its successful operation or causing excessive wear and which does not require to be lubricated.

In United States Letters Patent No. 1,147,620, granted to me the 20th day of July, 1915, I have shown and described a universal joint of the same general type as the one which forms the subject matter of my present invention, which, however, differs from the patented structure in many particulars which will be obvious upon comparison, but which it is considered unnecessary to point out in detail in this application.

In order to better describe my present invention, I shall have reference to the accompanying drawings, in which:

Fig. 1 is a longitudinal diametrical section of my improved universal joint and shows the same attached to the two shaft sections;

Fig. 2 is a view looking in the direction of the arrow 2 in Fig. 1;

The same reference characters will be used to designate the same parts throughout the several views.

Figure 3:
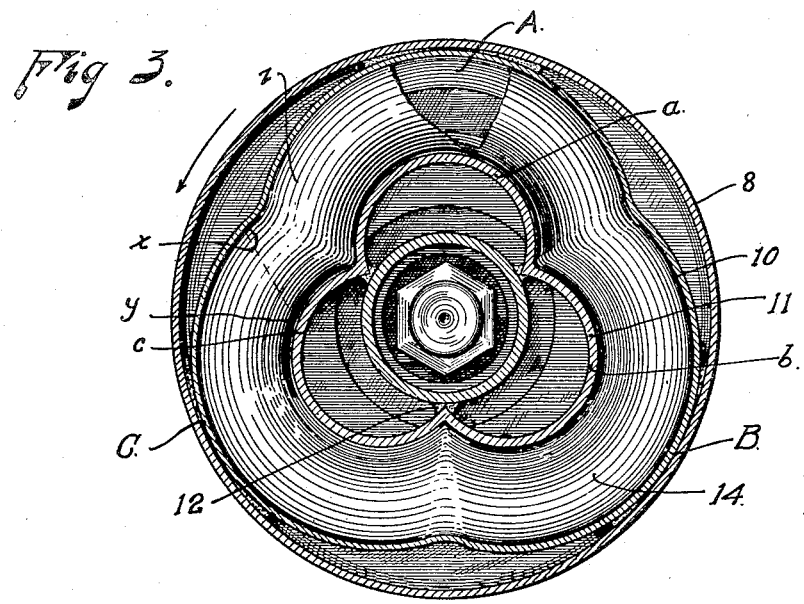
Fig. 3 is a section taken on line 3—3, Fig. 1.
Figures 4, 5:
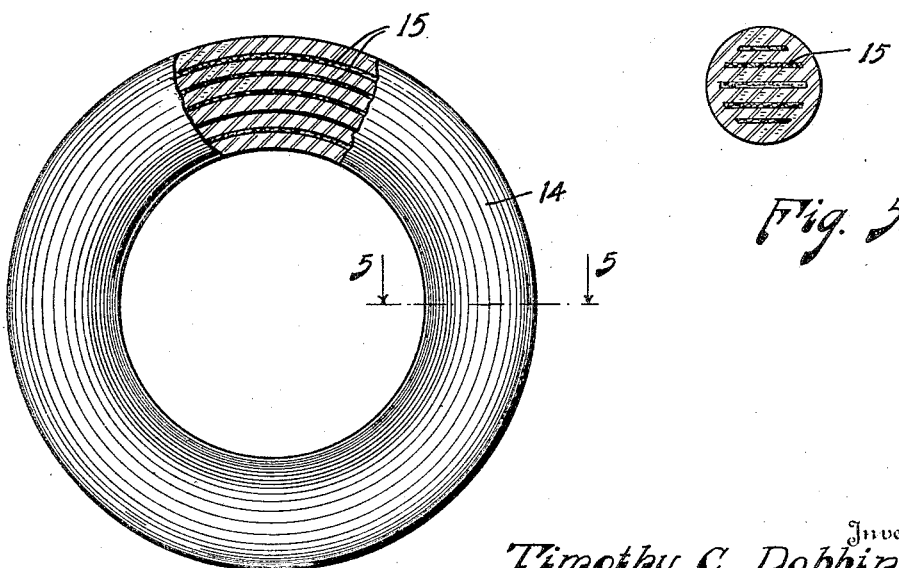
Fig. 4 is a side elevation of the resilient coupling member with a portion thereof broken away to show the re-enforcing members.
Fig. 5 is a transverse section taken on line 5—5, Fig. 4.

Numeral 1 represents the end of a drive shaft and 2 the driven shaft which may be connected to the differential of the rear axle of an automobile. Secured to the tapered end of the drive shaft by the usual arrangement of key 3 and nut 4 is a member 5 having a flange 6 to which is secured by suitable means, such as bolts 7, a cylindrical member 8 having an inwardly projecting flange 9 which co-operates with flange 6 for securing the two together in the manner shown in Fig. 1. Secured to the inner surface of the cylindrical portion 8 is a non-circular unitary ring 10 whose inner surface is transversely concave, as clearly shown in Fig. 1. Ring 10 is preferably formed of three arcuate portions A, B, and C which are welded to the inner surface of the cylindrical part 8. Secured to the tubular shaft 2 is a unitary ring 11 made up like ring 10 of three arcuate sections $a$, $b$ and $c$ whose transverse section is outwardly concave (Fig. 1). Ring 11 is preferably welded to shaft 2, as indicated at 12 (Figs. 2 and 3). The two rings 10 and 11 are so formed that when assembled, one within the other, as indicated in Figs. 1, 2 and 3, the arcuate portions A$a$, B$b$ and C$c$ will be equally spaced from each other. A resilient rubber ring 14 which is formed of properly cured rubber, such as employed in the tread portion of ordinary automobile casings, and provided interiorly with several spaced bands of cord or breaker-strip fabric-reinforcing material 15, is forced into the space between the two rings in the manner shown in Figs. 1, 2 and 3, being somewhat compressed, as shown in Fig. 1.

It is now clearly evident that when the parts are assembled, as shown in the drawings, that a turning of drive shaft 1 will, as a matter of necessity, result in a similar corresponding rotation of shaft 2, the power being transmitted through the medium of rings 10 and 11 and the rubber ring 14. As rings 10 and 11 are non-circular slipping cannot occur and since ring 14 is made of yielding resilient material, any sudden shocks will be absorbed thereby and smoothened out before it reaches the differential gears.

The arrangement of the parts is such that shaft 2 is automatically kept centered so as to avoid any vibration due to shaft 2 rotating about an axis of rotation that does not coincide with its material axis.

I wish to call attention at this point to what I consider a very important feature in the operation of my device, namely, the fact that the ring 14 is constantly rotating with respect to rings 10 and 11, thus exposing different portions of the resilient ring to the compression strains that take place.

If we consider Fig. 3 and imagine that the cylindrical part 8 and ring 10 tend to move in a counter-clockwise direction, as indicated by the arrow, which movement is resisted by ring 11, we will readily see that the rubber ring 14 will be compressed between points $x$ and $y$, which compressive strain forces some of the rubber to point $z$, and when the force between $x$ and $y$ is diminished, an imperceptible movement of the ring 14 takes place. From actual tests it has been found that ring 14 will move fully two inches in a run of three thousand miles. In the manner just explained, different parts of ring 14 are successively exposed to the severest strains, which, in this manner, are distributed over the entire ring with the result that the latter will last much longer than it would if it were cemented to ring 10.

Attention is called to the fact that my improved resilient universal joint has only a very few parts. Ring 11 is made of such size that it can be electrically welded to shaft 2 and ring 10 is welded directly to the inside of cylindrical portion 8. If found desirable, ring 10 can be formed directly from the sides of cylindrical member 8 in the manner shown in my United States Letters Patent No. 1,416,341 granted May 16, 1922.

Since the rear axle of an automobile moves up and down with respect to the engine, it is evident that the distance from shaft 1 to the differential housing is constantly changing while the car is running. In order to permit a slight elongation to take place, I have made the concave co-operating sides of rings 10 and 11 of a considerably greater radius than that of ring 14 with the result that the latter can roll in the former and this permits the required longitudinal adjustment to take place.

In Fig. 1 the shafts 1 and 2 are shown with their axes aligned, whereas the normal relationship is slightly angular. It is readily apparent, however, that shafts 1 and 2 may be placed at an angle to each other. As ring 14 is made of yielding resilient material and since rings 10 and 11 are curved on a greater radius than ring 14 (Fig. 1), the latter can roll on the rings and thus permit the shafts to rotate at an angle to each other as well as to move longitudinally, as above explained.

The operation of my improved universal joint is noiseless and resilient and does not require lubrication. As pointed out above, the resilient feature prevents the pulsation of the engine from being transmitted to the rear axle and in this manner results in smoother running of the machine.

I intend to employ the broad idea underlying this invention in other relationships than those shown and described. In fact, the idea of the non-circular rings separated by a resilient member can be employed wherever power is to be transmitted through a resilient coupling or where a resilient resistance is to be opposed to a variable force.

Having now described my invention, what I claim as new is:

1. A universal joint having a hublike member adapted to be secured to the end of a shaft, said member having an outwardly extending flange, a cylindrical member secured to said flange, a non-circular member secured to the inner surface of said cylindrical member, said non-circular member having its inner surface transversely concave, a second co-operating non-circular member having its outer surface transversely concave and adapted to co-operate with the first mentioned non-circular member to hold a ring of yielding material, and a ring of rubber composition between said concave surfaces.

2. A power-transmitting device having two co-operating rings whose adjacent surfaces are formed arcuate, but of different radii so as to form co-operating curved surfaces adapted to receive between them a resilient ring of rubber composition, said surfaces being formed on the interior of one member and on the exterior of the other.

3. A universal joint having a hub-like member adapted to be secured to the end of a shaft, said member having an outwardly extending flange, a non-circular member rigidly connected to said flange, said non-circular member having its inner surface transversely concave, a second cooperating non-circular member having its outer surface transversely concave and adapted to cooperate with the first mentioned non-circular member to hold a ring of yielding rubber composition between said concave surfaces.

In testimony whereof I affix my signature.

TIMOTHY C. DOBBINS.